Sept. 5, 1967 L. S. TAYLOR ETAL 3,339,519
LIQUID LEVEL GAUGE
Filed July 6, 1965 3 Sheets-Sheet 1
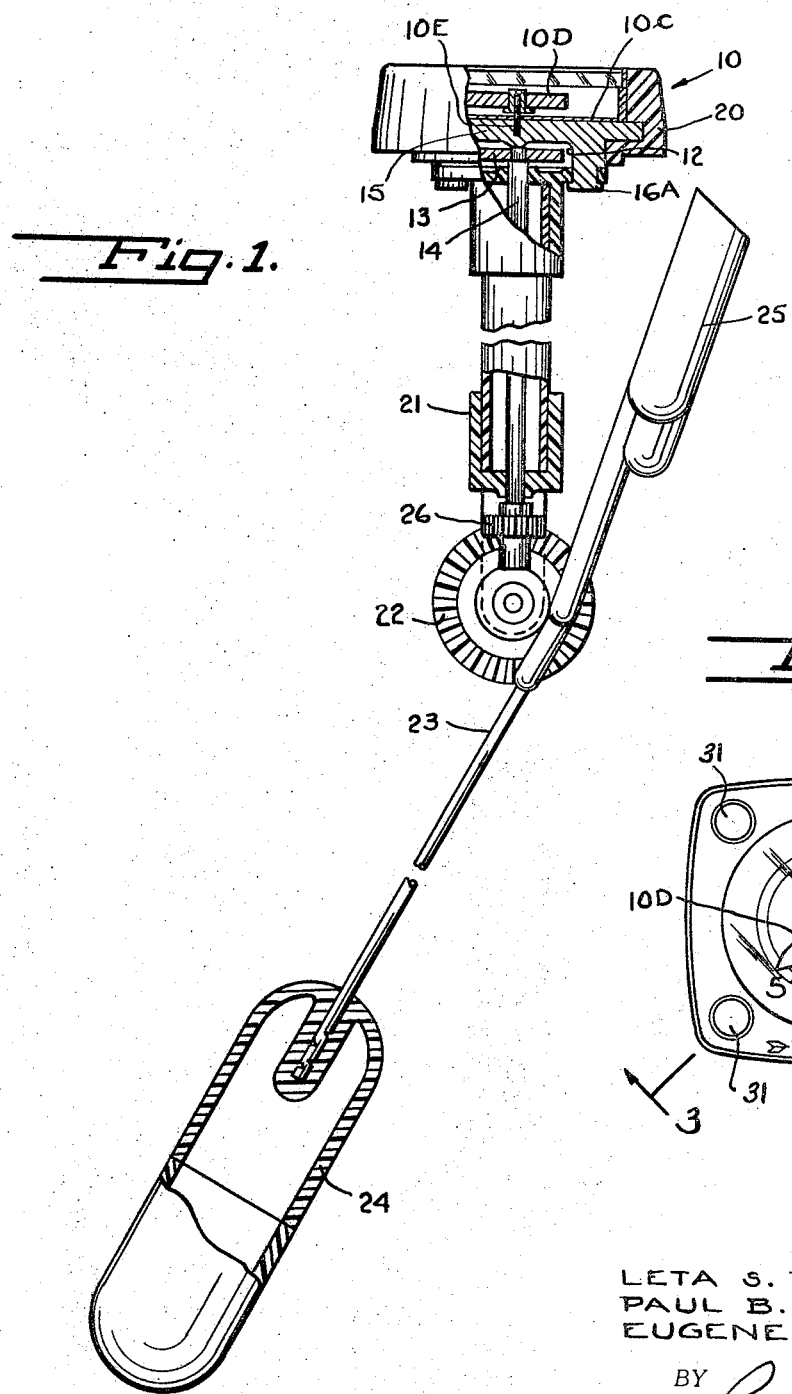
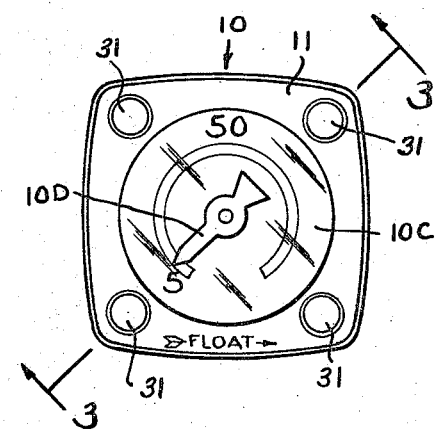
INVENTORS.
LETA S. TAYLOR
PAUL B. JOHNSON
EUGENE D. HUSKEY
BY
Raymond A. Paquin
ATTORNEY.

Sept. 5, 1967  L. S. TAYLOR ETAL  3,339,519

LIQUID LEVEL GAUGE

Filed July 6, 1965  3 Sheets-Sheet 2

INVENTORS.
LETA S. TAYLOR
PAUL B. JOHNSON
EUGENE D. HUSKEY

BY
ATTORNEY.

Sept. 5, 1967  L. S. TAYLOR ETAL  3,339,519

LIQUID LEVEL GAUGE

Filed July 6, 1965  3 Sheets-Sheet 3

INVENTORS.
LETA S. TAYLOR
PAUL B. JOHNSON
EUGENE D. HUSKEY

BY

ATTORNEY.

United States Patent Office 3,339,519
Patented Sept. 5, 1967

3,339,519
LIQUID LEVEL GAUGE
Leta S. Taylor, Paul B. Johnson, and Eugene D. Huskey, Garland, Tex., assignors to J. Y. Taylor Mfg. Company, a corporation of Texas
Filed July 6, 1965, Ser. No. 469,724
1 Claim. (Cl. 116—118)

This invention relates to liquid level gauges or the like and has particular reference to a new and improved construction for liquid level gauges for fluids or liquefied gases and especially those stored under pressure such as butane and propane, and the process of making same.

An object of the invention is to provide a new and improved frame construction for liquid level gauges which results in an effectively unitary gauge construction which is relatively simple and economical in construction and capable of withstanding the internal pressures in storage and fuel tanks and which is resistant to chemical reaction, and the process of making same.

Another object of the invention is to provide a new and improved liquid gauge and which is relatively simple and economical to manufacture and assemble, and the process of making same.

Another object is to provide a new and improved liquid level gauge head which is constructed of cast plastic material with reinforcement capable of withstanding the internal pressures in storage and fuel tanks and which has the heat and fire resistance of a metal gauge head combined with the economy of cast plastic manufacture.

Another object of the invention is to provide a new and improved liquid level gauge, the elements of which are capable of being manufactured by relatively simple and inexpensive casting process embodying a minimum of cast metal and the rest of relatively inexpensive plastic material.

Another object is to provide a new and improved gauge head having means for easy assembly to the riser assembly thereby providing a simplified and economical construction for liquid level gauges and the process of making same.

Another object is to provide a gauge head having a bearing surface at the top of the gauge head for the mounting screws for attaching the gauge to the storage tank adapter.

Another object is to provide a gauge head capable of withstanding exposure to open flame and temperatures that surpass the melting point of plastic material and yet is constructed to a large extent of plastic material, whereby if the plastic is burned or softened, the gauge head will still prevent escape of the tank contents.

Another object is to provide a gauge construction wherein the holding pressure of the mounting screws is transmitted from the screw head directly through the gauge head to the gasket and wherein the plastic portion of the head is not involved in mounting or sealing.

Another object is to provide a gauge head of the type set forth which does not require a separate gasket and wherein a raised radial plastic surface is provided at the bottom of the gauge head to provide an area of contact with the storage tank adapter.

Another object is to provide a new and improved gauge head which offers resistance to corrosion and does not require a protective finish and is resistant to chemical attack in contact with the contents of the storage tank or other corrosive material.

Another object is to provide a new and improved gauge head and process of making same which lends itself to the use of infinite colors and designs and any desired degree of transparency, translucency or opacity.

Another object is to provide a new and improved means for supporting gauge crystals in gauge heads which is simpler, more economical and which allows the crystals to be of desired shape, and with or without magnification and wherein the crystals can be color tinted if desired.

Other objects and advantages of the invention will be apparent from the foregoing description taken in connection with the accompanying drawings wherein the preferred form of the invention has been given by way of illustration.

Referring to the drawings:

FIG. 1 is a side view, partially in section, of a liquid level gauge embodying the invention;

FIG. 2 is a top or plan view of the gauge head and indicator head of the gauge shown in FIG. 1;

Figure 3:
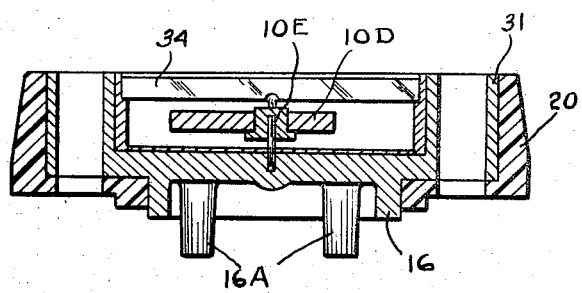
FIG. 3 is a fragmentary sectional view on a larger scale of the form of a modified form of gauge head.

Referring more particularly to the drawings wherein similar reference characters designate corresponding parts throughout the several views, the device shown formed according to the invention comprises a gauge head designated generally at 10, having the rim 11 through which are provided openings 11A for bolts or other suitable fastening means for securing the gauge head 10 in operative position over an opening in the storage tank. Gauge head 10 is provided with chamber 10B in which is scale or dial 10C on which the contents of the tank is indicated by pivoted indicator or arrow 10D, which is pivotally mounted on pivot 10E.

The locating lugs 10F for dial 10C and opening 10G for the indicator pivot are formed in.

Gauge head 10 is provided with chamber 12 for drive magnet 13 which is rigidly secured on the upper end of rotatably mounted shaft 14, whereby pivotal movement or rotation of shaft 14 effects simultaneous rotation or pivotal movement of drive magnet 13, which in turn effects pivotal movement or rotation of indicator 10D through the magnetic action of magnet 13.

The upper surface of chamber 12 is closed by the wall of insert 15 which is formed of die cast metal such as zinc or aluminum and has the integral tubular connector portion 16 depending therefrom, which is secured in position on the upper end of adapter 17 for tubular riser 18 which is in telescoping relation with adapter or connector portion 17 and secured thereto by bonding or staking of projections 16A which extend through openings in adapter 17 to form an effectively unitary construction.

Connector 16 and projections 16A are die cast integral with insert 15. As shown in FIGS. 3, 5, 6 and 7, the screw bearings 31 may be die cast integral with insert 15 and connector 16 and projections 16A.

In the form of the invention shown in FIGS. 1–3 and 5–7, the insert 15 has the four bosses or integral projections 31 at each corner to transmit pressures from each mounting screw or bolt through metal to the bottom side of the insert 15. This pressure is then transmitted to the raised radial surface of the head and the concentration of pressures at this point create the seal between the gauge head and the storage tank adapter also insures the seal between the plastic and metal insert.

Figure 5:
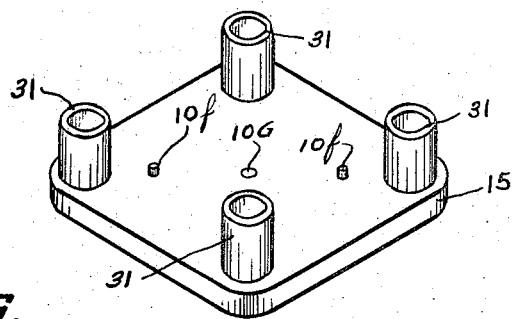
FIG. 5 is a top perspective view of the metal insert employed in the manufacture of one form of the invention.
Figure 6:
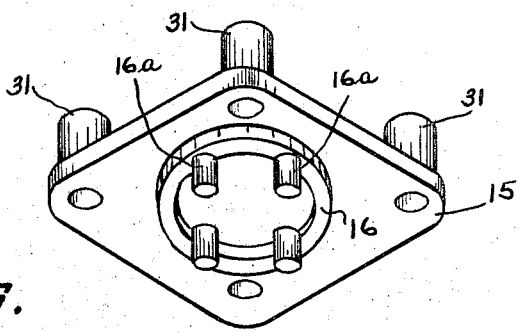
FIG. 6 is a bottom perspective view of the metal insert of FIG. 5.

The die cast insert 15 with the integral bosses 31 as shown in FIGS. 5 and 6 is then placed in a suitable mold and the head 20 is then molded to desired shape and size.

The head 20 is molded or cast of any suitable plastic material such as nylon, polystyrene, acrylonitrile-butadiene-styrene composition, acrylics, vinyls or other plastic composition having sufficient strength and which is relatively stable, tough, hard and rigid and withstands acids and pressure and resists weather, and depending upon the material with which the gauge is to be used.

Figure 4:
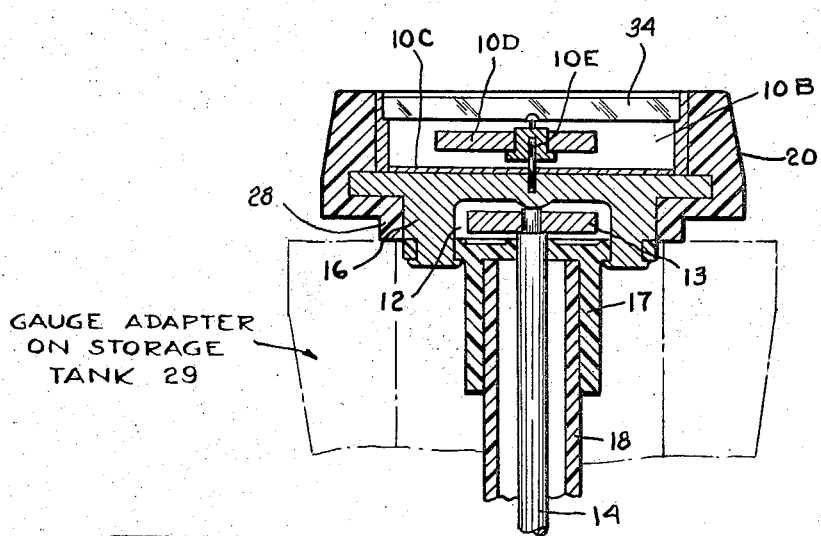
FIG. 4 is a sectional view of the gauge head of FIG. 1 and FIG. 2.

In the form shown in FIG. 4, the openings 11A are formed directly in the plastic head 20 without the bosses 31. While this arrangement reduces the amount of metal employed and therefore is more economical, it does not have the advantages of the form with the bosses 19 as set forth above.

The riser 18 has the fork 21 adjacent its end opposite gauge head 10 and on this fork is pivotally mounted gear 22 carrying float rod 23 on which is positioned float 24 and counterweight 25 is also connected to said gear 22 which gear meshes with gear 26 on the end of shaft 14 for transmitting motion to said shaft according to the position of float 24 which is controlled by the quantity of liquid in the tank and pivotal movement of said shaft 14 pivots drive magnet 13 to effect adjustment of indicator 10D to indicate on scale or dial 10C the quantity of liquid in the tank.

Figure 7:
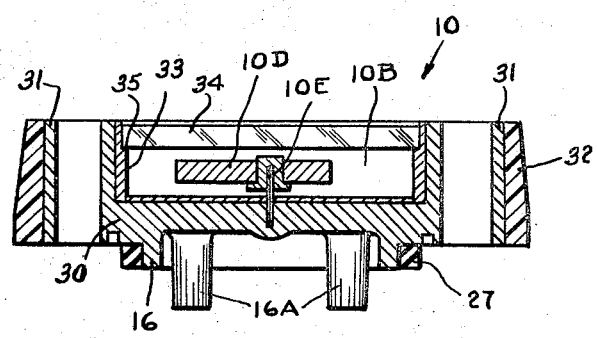
FIG. 7 is a sectional view of the modified form of gauge head shown in FIG. 3.

The gauge head 10 may be provided with a separate sealing gasket 27 of stamped or molded asbestos, Teflon or other suitable material as shown in FIG. 7 or the gasket may be formed integral with the head as shown in FIG. 4 by forming a radial formation 28 on the lower periphery of gauge head 10 which formation eliminates the gasket and provides a seal between the gauge head 10 and the storage tank adapter 29.

The form of gauge head shown in FIGS. 3 and 7 is designed to withstand exposure to open flame and temperatures that surpass the melting point of plastic but not that of the metal insert 30. In this form the holding pressure of the mounting screws or bolts is transmitted from the screw head, directly through the integral bosses 31 and metal insert 30 to the gasket 27 and the plastic portion 32 is not involved in mounting or sealing.

With this form of gauge head, if the plastic portion 32 is softened by heat or even completely burned, the metal insert 30 will remain securely mounted on the storage tank opening or adapter and prevent escape of the tank contents.

Another feature of the gauge head of the present invention is to provide a new and improved gauge crystal mounting arrangement which is relatively simple and economical and which eliminates the necessity of employing the usual crystal gasket thereby enabling the use of a larger dial face and the dial is therefore more visible and more easily read.

This is accomplished by means of the plastic side walls 33 of the recessed indicating portion which provides a direct means for attacking the gauge crystal which can be assembled and sealed using a plastic to plastic solvent or adhesive cement, hot or cold, or forming over the crystal 34 or ultrasonic welding process can be employed. This arrangement eliminates the use of a sealing gasket as previously described.

As shown the crystal 34 is positioned on a cast or molded flange 35 on the plastic side wall 33 but such shoulder could be dispensed with but it could be employed to facilitate the mounting of the crystal.

The crystal 34 is preferably a molded or cast transparent plastic disc, transparent or tinted and could have its surfaces curved to provide magnification of the viewed image of the dial and indicator. The crystal could also be made by other process such as stamping or machining.

The plastic cast or molded portion of the head can be clear or of any desired color or combination of colors.

From the foregoing it will be seen that I have provided new and improved means and process for obtaining all of the objects and advantages of the invention.

We claim:

A gauge head for a magnetic type liquid level gauge comprising a metal portion for closing and sealing the opening in a storage tank, said metal portion having a central recess in its lower side, an adapter closing said central recess, spaced openings in said adapter, and means adjacent the periphery of said central recess for connection to said adapter for closing said central recessed portion, said means comprising a plurality of spaced integral projections extending through respective said openings in said adapter, said projections being deformed to lock said metallic portion in operative relation, said metal portion also including a plurality of upwardly extending bosses, each said boss being provided with an opening therein for reception of a mounting bolt for securing the gauge head in operative position over the opening in the storage tank, said adapter having an opening therein and a drive shaft extending into said central recessed portion through said opening in said adapter, a drive magnet in said central recessed portion and operatively connected to said drive shaft, a non-metallic head surrounding and substantially enclosing the peripheral portion of said metal portion and forming a chamber on the side of said metal portion opposite said central recessed portion, a scale in said chamber and an indicator pivotally mounted in said chamber relative to said scale and actuated by said drive magnet.

References Cited

UNITED STATES PATENTS

| | | | |
|---|---|---|---|
| 1,442,758 | 1/1923 | Wilcox | 58—55 |
| 1,911,099 | 5/1933 | White et al. | 73—290 |
| 1,937,231 | 11/1933 | Klein | 73—82 |
| 2,012,002 | 8/1935 | Finch | 58—55 |
| 2,097,278 | 10/1937 | Hastings | 73—290 |
| 2,300,614 | 11/1942 | Connolly et al. | 73—290.1 |
| 2,350,164 | 5/1944 | Heymann | 58—55 |
| 2,473,581 | 6/1949 | Ford | 73—317 |
| 2,514,323 | 7/1950 | Ford | 116—118 |
| 2,528,640 | 11/1950 | Coleman | 324—115 |
| 2,580,057 | 12/1951 | Wilhelm | 73—317 |
| 2,584,446 | 2/1952 | Hastings et al. | 73—317 |
| 2,612,132 | 9/1952 | Triplett | 116—129 |
| 2,630,715 | 3/1953 | Hall et al. | 73—317 |
| 2,744,411 | 5/1956 | Spencer | 73—317 |
| 2,794,412 | 6/1957 | Rauth | 116—129 |
| 2,795,955 | 6/1957 | Hall | 73—317 |
| 2,828,625 | 4/1958 | Morphis et al. | 73—431 |
| 2,836,144 | 5/1958 | Morphis | 116—129 |
| 2,852,742 | 9/1958 | Bakke et al. | 324—115 |
| 2,866,940 | 12/1958 | Lamb | 73—431 |
| 2,992,560 | 7/1961 | Morgan et al. | 73—317 |
| 3,043,038 | 7/1962 | Marble | 58—55 |
| 3,138,137 | 6/1964 | Hubner | 116—129 |
| 3,162,173 | 12/1964 | Morgan et al. | 116—129 |

LOUIS J. CAPOZI, *Primary Examiner.*